United States Patent [19]

Rosenberg

[11] Patent Number: 4,781,217
[45] Date of Patent: Nov. 1, 1988

[54] PULSE-IRRIGATION METHOD AND APPARATUS

[76] Inventor: Peretz Rosenberg, Moshav Beit Shearim, Israel

[21] Appl. No.: 88,548

[22] Filed: Aug. 20, 1987

Related U.S. Application Data

[63] Continuation of Ser. No. 826,749, Feb. 6, 1986, abandoned.

[30] Foreign Application Priority Data

Feb. 13, 1985 [IL] Israel .................................. 74332

[51] Int. Cl.$^4$ ................................................ E03B 7/07
[52] U.S. Cl. .............................. 137/624.14; 251/118; 137/469; 137/536
[58] Field of Search .................... 137/624.14, 536, 220, 137/538, 469; 251/118

[56] References Cited

U.S. PATENT DOCUMENTS

| | | | |
|---|---|---|---|
| 1,966,854 | 7/1934 | Eskilson | 137/624.14 |
| 2,239,169 | 4/1941 | Franck | 137/536 |
| 2,321,423 | 6/1943 | Rogers | 137/624.14 |
| 2,345,380 | 3/1944 | Kirk | 137/624.14 X |
| 2,415,258 | 2/1947 | Parker et al. | 137/536 |
| 2,462,614 | 2/1949 | DeWitt | 137/624.14 X |
| 2,995,147 | 8/1961 | Bergquist | 251/118 X |
| 3,326,237 | 6/1967 | Frick | 137/624.14 |
| 3,943,969 | 3/1976 | Rubin et al. | 137/538 |
| 4,226,261 | 10/1980 | Ekeleme et al. | 137/469 |
| 4,246,921 | 1/1981 | Beccaria et al. | 137/624.14 X |
| 4,301,967 | 11/1981 | Hunter | 137/624.14 X |
| 4,474,207 | 10/1984 | Rosenberg | 137/220 X |

FOREIGN PATENT DOCUMENTS 507711  4/1976  U.S.S.R. ......................... 137/624.14

Primary Examiner—John Rivell
Attorney, Agent, or Firm—Benjamin J. Barish

[57] ABSTRACT

A pulse-irrigation system comprises a pressurized water supply line supplying water in a continuous, non-interrupted manner, a water irrigation device, and a pulsating device for converting the pressurized water of the line to the pulsating output when supplied to the irrigation device. The pulsator device comprises an inlet orifice of restricted cross-sectional area, an outlet orifice of substantially larger cross-sectional area, and a valve which is normally closed, automatically opens at a predetermined opening pressure lower than that of the inlet pressure to connect its inlet to its outlet, and automatically closes at a predetermined closing pressure lower than its opening pressure. The pulsator device further includes a reservoir for the fluid and located between the inlet orifice and the valve such that when the valve is closed the reservoir fills up and at the same time builds up pressure until the valve opens to discharge the fluid within the reservoir.

16 Claims, 2 Drawing Sheets

PULSE-IRRIGATION METHOD AND APPARATUS

This application is a continuation of application Ser. No. 826,749, filed Feb. 6, 1986, now abandoned.

RELATED APPLICATION

The invention of the present application is related to Applicant's copending patent application 06/746,863, filed June 20, 1985, now U.S. Pat. No. 4,678,004.

BACKGROUND OF THE INVENTION

The present invenytion relates to a pulse-irrigation method and apparatus for converting a substantially steady-state pressure of a water supply line to a pulsating pressure when applied to water sprinklers or other irrigation devices.

There are many situations where it is desired to convert the pressure of a water irrigation supply line to a pulsating pressure. For example, pulsating devices are sometimes used in water sprinklers or water sprayers in order to reduce the total water output while still distributing the water over large areas. Pulsating devices are also used for reducing the water output of sprinklers for cooling greenhouses, for lowering the output rate of drippers, and for reducing the tendency of sprinklers or drippers to become clogged by foreign particles. The conventional method of pulsating the supply line is to include a valve which is periodically driven, either by the fluid of the supply line itself or by an external drive, to periodically open and close the valve and thereby to periodically interrupt the flow of the water therethrough. Such arrangements, however, are relatively inefficient, expensive, and/or not conveniently adjustable to vary the pulsating frequency or the pulsating periods.

SUMMARY OF THE INVENTION

An object of the present invention is to provide a pulse-irrigation system having advantages in the above respects.

According to the present invention, there is provided a pulse-irrigation system comprising a pressurized water supply line supplying water in a continuous, non-interrupted manner, a water irrigation device, and a pulsating device for converting the pressurized water of the line to a pulsating output when supplied to the irrigation device. The pulsating device comprises a valve which is normally closed, which automatically opens at a predetermined opening pressure lower than that of the supply line to connect its inlet to its outlet, and which automatically closes at a predetermined closing pressure which is lower than its opening pressure; an inlet coupling between the inlet of the valve and the pressurized fluid supply line, the inlet coupling including a reservoir for the fluid, and an inlet orifice having a restricted cross-sectional area between the reservoir and the pressurized fluid supply line; and an outlet coupling connected to the outlet of the valve and having an outlet orifice of substantially larger cross-sectional area than the inlet orifice.

Such a pulsator device operates as follows: The valve is normally closed, so that when the fluid supply line is connected to the inlet coupling, the reservoir of the inlet coupling fills up at a slow flow rate and at the same time builds up the pressure applied to the normally-closed inlet of the valve. When the pressure rises to the opening pressure, the valve quickly opens, and the fluid accumulated within the reservoir quickly discharges at a high flow rate through the outlet orifice. Since the inlet orifice is of smaller cross-sectional area than the outlet orifice, the water discharges via the outlet orifice faster than it is inletted via the inlet orifice; thus, the pressure in the reservoir drops. When it drops to the closing pressure (which, as noted above, is lower than the opening pressure), the valve automatically closes, and the reservoir again begins to accumulate fluid from the supply line and to build up the pressure at the inlet to the valve.

According to another aspect of the present invention there is provided a method of irrigation comprising directing pressurized water in a continuous non-interrupted manner into a reservoir at a slow rate; outletting the water from the reservoir to an irrigatuon device via an outlet orifice permitting a substantially larger rate of flow than that into said reservoir; and controlling the outletting of the water from the reservoir to the outlet orifice by a valve which is normally closed, which automatically opens at a predetermined opening pressure lower than that of the supply line to connect its inlet to its outlet, and which automatically closes at a predetermined closing pressure which is lower than its opening pressure.

In one described embodiment, the reservoir is a resilient tube defining an expansible-contractible chamber. Such an arrangement permits the pulsator to be constructed very inexpensively. In a second described embodiment, the reservoir is a pressurized container enabling a larger quantity of fluid to be accumulated before discharge; and in a third described embodiment, the reservoir is a long vertical tube venyted to the atmosphere enabling an even larger quantity of fluid to be accumulated before discharge.

In all the described embodiments, the inlet orifice is in the form of a fitting having a small orifice applied to the inlet end of the inlet coupling; and the outlet orifice is also in the form of a fitting, but having a larger orifice, applied to the outlet end of the valve. With such an arrangement, the pulsating frequency and periods can be conveniently varied by merely changing the volume of the reservoir, e.g., the length of the resilient tube, and by changing the inlet and outlet orifice sizes.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
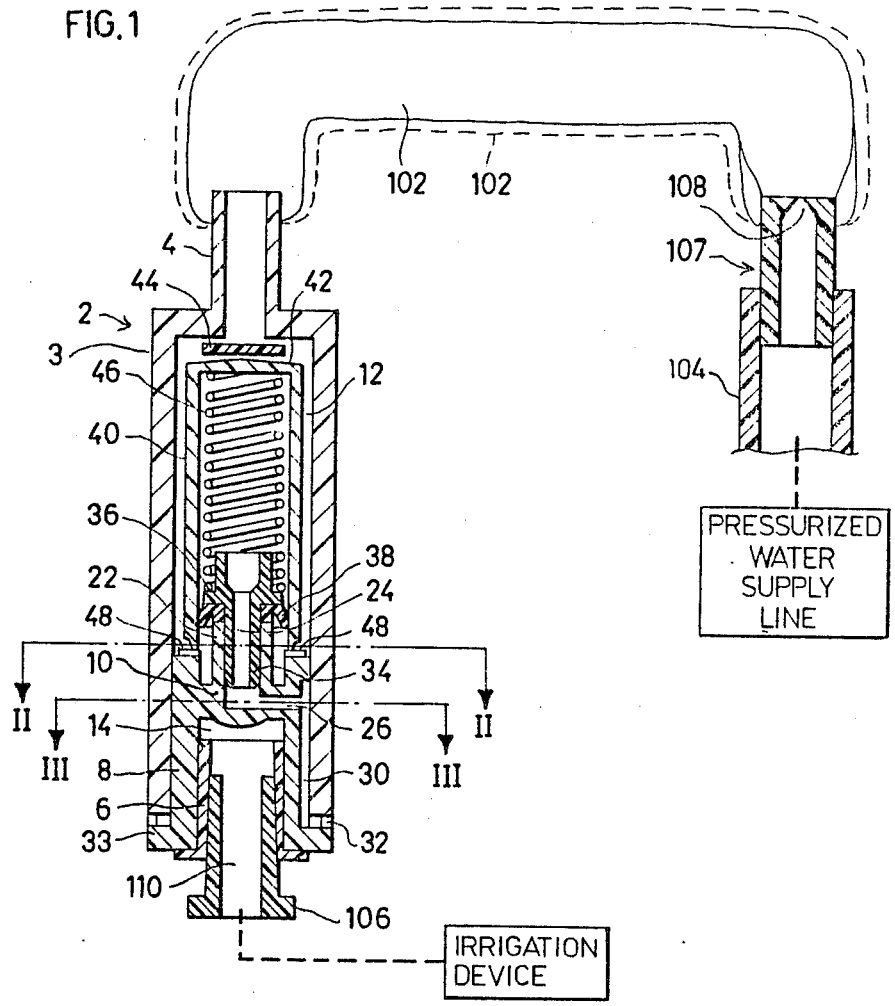
FIG. 1 illustrates one form of pulsator device constructed in accordance with the present invention.

The pulsator device illustrated in FIG. 1 comprises a valve, generally designated 2, of the same construction as described in my pending patent application Ser. No. 06/746,863 filed June 20, 1985, now U.S. Pat. No. 4,678,004. Briefly, valve 2 is normally closed, but when subjected to a relatively high opening pressure, it automatically opens with a snap action, and remains open until the pressure drops substantially below the opening pressure, whereupon it automatically closes also with a snap action. The illustrated pulsator device further includes an inlet fitting 102 connectable between the inlet of valve 2 and the pressurized supply line 104; and an outlet coupling 106 connected to the outlet of the valve.

More particularly, valve 2 comprises a cylindrical housing 3 formed at one end with a reduced diameter extension 4 defining a port connectable to the inlet fitting 102. The outlet coupling 106 is formed with an enlrged head for coupling to the outlet (pulsed) line, and is coupled to the opposite end of housing 3 via an outlet collar 6 frictionally received within a sleeve 8 which sleeve is in turn frictionally received within the opposite end of housing 3.

Sleeve 8 is integrally formed with an annular ring or partition 10 defining, on opposite sides, a first chamber 12 communicating with the inlet extension 4, and a second chamber 14 communicating with the outlet collar 6. As shown particularly in FIG. 3, annular ring 10 includes a diametrically-extending web 16 defining two openings 18, 20 serving as an interconnecting passageway connecting the inlet chamber 12 to the outlet chamber 14. Annular ring 10 is further formed with an upstanding stem 22 having a vertical bore 24 communicating at its lower end with a horizontal bore 26 formed through one-half of web 16 and extending to the outer face of sleeve 8. The latter face of the sleeve is flattened on one side, as shown at 28 in FIG. 3, to define a venting passageway 30 between it and housing 3. This passageway communicates with the atmosphere via the spaces between a plurality of ribs 32 formed at the end of housing 3 engageable with a flange 33 formed at the lower end of sleeve 8.

Stem 22 receives a sleeve 34 formed at its upper end with an annular shoulder 36 carrying a sealing ring 38 on its lower face, i.e. on the side facing the annular ring 10. Annular flange 36, together with its sealing ring 38, constitutes a piston cooperable with a cylinder 40 having its open end received over the sealing ring, and its opposite end closed by an end wall 42 adjacent to the inlet extension 4. A resilient disc 44, of rubber or the like, is.interposed between the cylinder end wall 42 and the inlet extension 4. In addition, a coiled spring 46 is interposed between the inner face of cylinder end wall 42 and the face of annular shoulder 36 opposite to that carrying the sealing ring 38.

Figure 2:
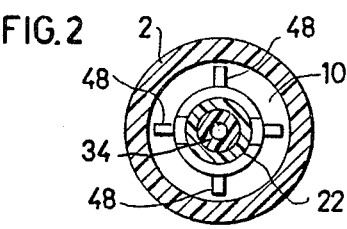
FIGS. 2 and 3 are sectional views along lines II—II and III—III of FIG. 1.

As shown in FIG. 2, the upper surface of annular ring 10, i.e. the surface facing the open end of cylinder 40, is formed with a plurality of circumferentially-spaced ribs or abutments 48 engageable with the open end of cylinder 40 so as to continuously maintain communication between the inlet chamber 12 and the outlet chamber 14 via passageways 18 and 20 through the annular ring 10.

Inlet fitting 102 is in the form of a resilient tube, preferably of elastomeric material, which is applied between the fluid supply line 104 and the inlet end of valve 2. The inlet end of resilient tube 102 includes a rigid tubular connector 107 formed with an orifice 108 of relatively small cross-sectional area, i.e., smaller than orifice 110 formed in the outlet fitting 106. The latter is inserted, as by press-fitting, within the outlet collar of valve 2.

Figure 3:
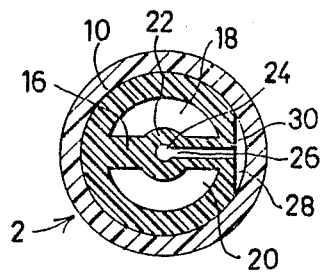

The pulsator illustrated in FIGS. 1-3 operates as follows:

As noted above, annular shoulder 36, together with its sealing ring 38, defines a piston fixed within housing 3, which piston is cooperable with cylinder 40. Cylinder 40 is biased by spring 46 in the direction tending to cause its end wall 42 to press the resilient disc 44 against the inlet opening defined by housing extension 4. The outer diameter of resilient disc 44 is slightly larger than the diameter of the inlet bore defined by extension 4, but is slightly smaller than the outer diameter of cylinder 40. As one example, the inner diameter of the inlet bore may be 4 mm., the outer diameter of disc 44 may be 5 mm., and the outer diameter of cylinder 40 may be 8 mm.

Thus, when the valve is connected between the inlet and outlet fittings, the force of spring 46 biases cylinder 40 to close the inlet extension 4, until the inlet pressure reaches a predetermined value sufficient, by the force applied by it to disc 44, to overcome the force of spring 46. The force applied by the inlet pressure to disc 44 is dependent on the cross-sectional area of the inlet bore, which in the described example is 4 mm. As soon as the inlet pressure reaches a value such that it, when multiplied by the cross-sectional area of the inlet bore 4, overcomes the force of spring 46, this inlet pressure moves disc 44 together with cylinder 40, away from the mouth of the inlet bore 4; and as soon as this occurs, the effective area is immediately increased to that of the cross-sectional area of cylinder 44 (the latter cylinder having a diameter of 8 mm. in this example), to produce a very quick-action opening of the inlet bore 4.

During this opening movement of cylinder 40, abutments 48 in annular ring 10 engage the open end of cylinder 40 and keep it spaced from the annular ring, thereby continuously maintaining communication through the spaces between the abutments and through passageways 18 and 20 to the outlet chamber 14; thus, there is a continuous flow of water from inlet extension 4 through the outlet collar 6. The venting of the interior of cylinder 40 to the atmosphere via bores 24 and 26, space 30, and the spaces between ribs 32, permits this displacement of the cylinder when the inlet pressure has risen to the predetermined minimum for opening the valve.

Thus, when the valve is in its open position, pressurized water flows from the inlet 4 through the spaces between abutments 48 and the open end of cylinder 40, passageways 18 and 20, and through the outlet 6, to supply pressurized water to the outlet fitting 6.

During this open condition of the valve, the inlet pressure is applied to the enlarged cross-sectional area of cylinder 4 to maintain the valve in its open condition. However, if the inlet pressure should drop below another predetermined value (lower than the opening pressure because the effective surface area has now been enlarged so as to be the total cross-sectional area of cylinder 40), spring 46 will move cylinder 40 and its disc 44 back against the mouth of the inlet bore 4 to close the bore; and as soon as this occurs, the effective area is now reduced to that of the inlet bore 4, thereby providing a quick-action closing of the inlet bore.

When the inlet coupling 102 is connected to the pressurized fluid line 104, valve 2 is normally in its closed condition, as described earlier. Accordingly, as the water flows into resilient tube 102, the latter tube will expand, as shown by the broken lines in FIG. 1, thereby building up the pressure within the tube. When the pressure builds up to the opening pressure of valve 2, the latter will open as described above; this produces a fast discharge of the fluid within tube 102 through the valve and out through the outlet fitting 106. Since the inlet orifice 108 of the inlet fitting 107 is of smaller cross-sectional area than the outlet orifice 110 of the outlet fitting 106, the flow of the water out of tube 102 will be faster into the tube; therefore, the pressure applied by tube 102 to the inlet to valve 2 will drop. When it drops to the valve-closing pressure, which is lower than the valve-opening pressure as described above, the valve will automatically close with a snap action.

Resilient tube 102 will then again start to expand, building up the pressure applied to valve 2, until the latter valve again opens to output another pulse of fluid via the outlet orifice 106.

As mentioned earlier, resilient tube 102 determines the volume of the expansible-chamber reservoir, and therefore this tube may be substituted by one having a smaller or larger length or diameter, depending on the desired volume of this reservoir. It will be appreciated that by the appropriate selection of the diameter and length of the resilient tube 102, and of the sizes of orifices 108 and 110 in fittings 106 and 107, respectively, a wide range of pulsating frequencies and periods may be conveniently provided.

Figure 4:
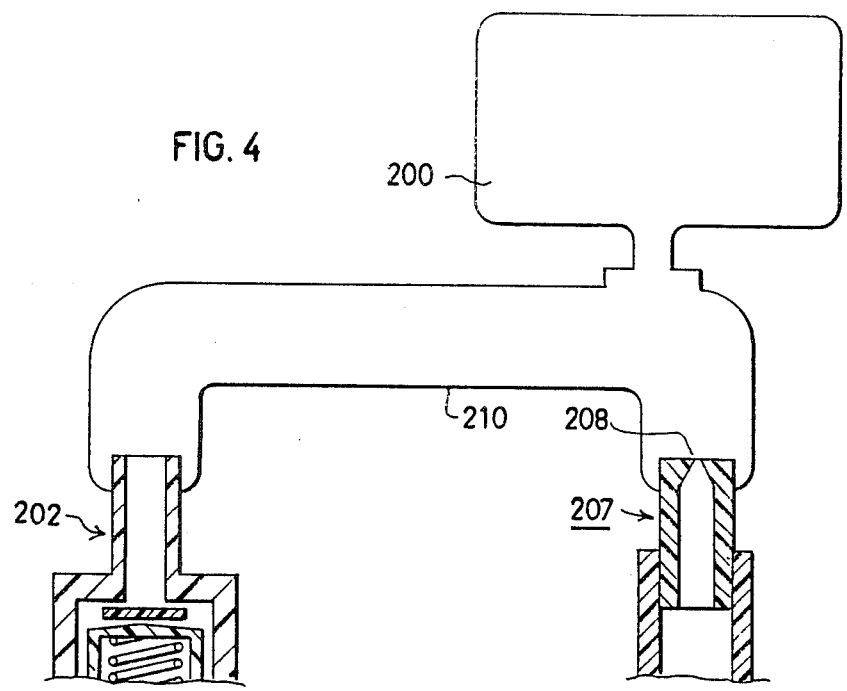
FIGS. 4 and 5 are fragmentary views illustrating two variations in the pulsator device of FIG. 1.
Figure 5:
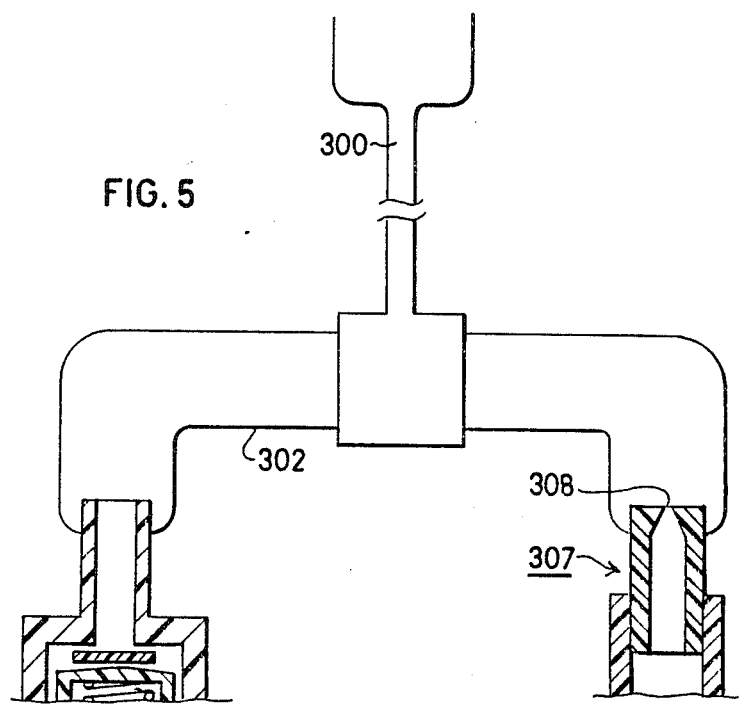

FIGS. 4 and 5 illustrate two variations which may be used in order to increase the duration of each pulsating period.

Thus, FIG. 4 illustrates an arrangement wherein the reservoir is in the form of a pressurized container 200 between the inlet of valve 202 and the inlet connector 207 containing the inlet orifice 208. The water enters and leaves through the bottom of the container, the top of the container being closed. Container 200 may be provided in addition to, or in lieu of, resilient tube 210.

FIG. 5 illustrates a variation wherein the reservoir is in the form of a long vertical tube 300 between the valve 302 and the inlet connector 307 having the inlet orifice 308. Tube 300 is of a height to produce a pressure head greater than the inlet pressure so that, even though the upper end of the long vertical tube is vented to the atmosphere, no water is discharged through its upper end.

Many other variations, modifications and applications of the invention will be apparent.

I claim:

1. A pulse-irrigation system comprising a pressurized water supply line supplying water in a continuous, non-interrupted manner, a water irrigation device, and a pulsating device for converting the pressurized water of the line to a pulsating output when supplied to the irrigation device, comprising:
   a valve which is normally closed, which automatically opens at a predetermined opening pressure lower than that of the supply line to connect its inlet to its outlet, and which automatically closes at a predetermined closing pressure which is lower than its opening pressure;
   an inlet coupling between the inlet of said valve and said pressurized water supply line, said inlet coupling including a reservoir for the water, and an inlet orifice producing a continuous, non-interrupted flow of water at a low flow rate into said reservoir from said pressurized water supply line;
   and an outlet coupling connected to the outlet of said valve and having an outlet orifice producing, when said valve is open, a flow out of said reservoir to said water irrigation device at a substantially higher flow rate than into said reservoir through said inlet orifice.

2. The device according to claim 1, wherein said reservoir includes a resilient tube defining an expansible and contractible chamber.

3. The device according to claim 1, wherein said reservoir includes a pressurized container.

4. The device accordng to claim 1, wherein said reservoir includes a long vertical tube having an upper end vented to the atmosphere.

5. The device according to claim 1, wherein said inlet orifice is defined by a fitting having a small orifice at the inlet end of said inlet coupling.

6. The device according to claim 1, wherein said outlet orifice is defined by a fitting having an orifice larger than said inlet orifice at the outlet end of said valve.

7. A pulse irrigation system comprising a pressurized water supply line supplying water in a continuous, non-interrupted manner, a water irrigation device, and a pulsating device for converting the pressurized water of the line to a pulsating output when supplied to the irrigation device, comprising:
   a valve which is normally closed, has a single inlet and a single outlet, which automatically opens at a predetermined opening pressure lower than that of the supply line to connect its single inlet to its single outlet, and which automatically closes at a predetermined closing pressure which is substantially lower than its opening pressure;
   an inlet coupling between the inlet of said valve and said pressurized water supply, said inlet coupling including a reservoir for the water, and an inlet orifice having a restricted cross-sectional area for producing a continuous, non-interrupted flow of water at a low flow rate into said reservoir from said pressurized water supply line; said inlet orifice being defined by a fitting having a small orifice at the inlet end of said inlet coupling;
   and an outlet coupling connected to the outlet of said valve and having an outlet orifice of substantially larger cross-sectional area than said inlet orifice for producing, when said valve is open, a flow out of said reservoir to the irrigation device at a substantially higher rate than the flow into said reservoir.

8. The device according to claim 7, wherein said reservoir includes a resilient tube defining an expansible and contractible chamber.

9. The device according to claim 7, wherein said reservoir includes a pressurized container.

10. The device accordng to claim 7, wherein said reservoir includes a long vertical tube having an upper end vented to the atmosphere.

11. The device according to claim 7, wherein said outlet orifice is defined by a fitting having an orifice larger than said inlet orifice at the outlet end of said valve.

12. The method of irrigation, comprising:
    directing pressurized water in a continuous, non-interrupted manner from a supply line into a reservoir at slow rate;
    outletting the water from said reservoir to an irrigation device via an outlet orifice permitting a substantially larger rate of flow than that into said reservoir;
    and controlling the outletting of said water from the reservoir to said outlet orifice by a valve which is normally closed, which automatically opens at a predetermined opening pressure lower than that of the supply line to connect its inlet to its outlet, and which automatically closes at a predetermined closing pressure which is lower than its opening pressure.

13. The method according to claim 12, wherein said reservoir includes a resilient tube defining an expansible and contractible chamber.

14. The method according to claim 12, wherein said reservoir includes a pressurized container.

15. The method according to claim 12, wherein said reservoir includes a long vertical tube having an upper end vented to the atmosphere.

16. The method according to claim 12, wherein said pressurized fluid supply line is a water supply line.

* * * * *